UNITED STATES PATENT OFFICE.

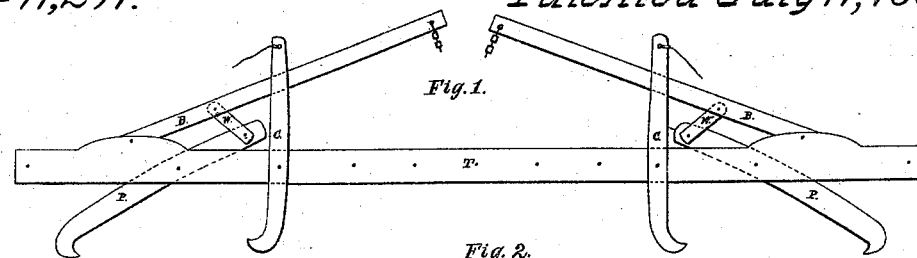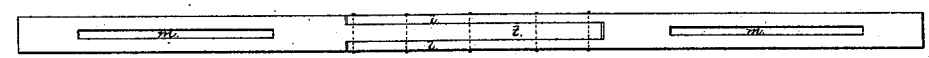

JOSEPH T. MARTIN, OF NEW YORK, N. Y.

GRAPPLE FOR RAISING SUNKEN VESSELS.

Specification of Letters Patent No. 11,291, dated July 11, 1854.

*To all whom it may concern:*

Be it known that I, JOSEPH T. MARTIN, of the city, county, and State of New York, have invented a new and useful Improved Marine Grapple to Hook into the Sides of Sunken Vessels, so that they can be raised to the surface of the water by being secured to camels, screws, or any other known means of raising sunken vessels; and I do hereby declare that the following is a full, clear, and exact description of the construction and operation of the same, reference being had to the annexed drawings, making a part of this specification, in which—

Figure 1 is a side view, Fig. 2 is a top view, and Fig. 3 is a view of the marine grapple attached to the sides of a sunken vessel.

The following is a description of the construction and operation of the marine grapple. It is made as follows: A stick of timber T, say about 21 feet long, and about 9 inches square (except for a space of about 2 feet near each end, and on the top side, which is some 5 or 6 inches deeper) is so divided near the middle of its length by a tongue $t$, and lips $l$ $l$, thus that it may be extended out some 5 or 6 feet longer, so as to be used on sunken vessels of various breadths of beam; at about 4 feet from each end of the stick of timber T, a mortise $m$ of about $1\frac{1}{2}$ inches in width, and about 4 feet long is cut through the whole depth of the timber T, through which is placed an iron plate P slightly curved, and about $5\frac{1}{4}$ feet long, 8 inches broad, and about $1\frac{1}{2}$ inches thick, the lower end of the plate P, is in the shape of a sharp pointed hook projecting some 5 inches for the purpose of hooking in the outside plank of the vessel to be raised; it may be here mentioned that 2 or more hooks may be on each of the plate P; about 18 inches of the plate projects above, and about $3\frac{1}{4}$ feet below the timber T; the plate P has a hole of $1\frac{1}{2}$ inches in diameter through it within 6 inches of its top end, to receive a steel pin as hereinafter described; at about 2 feet from the top end of the plate is another hole of about $1\frac{1}{2}$ inches in diameter, to receive a steel pin of the same size, which passes through the timber T near the center of the mortise $m$ and the plate P.

On the top side, and at about $2\frac{1}{2}$ feet from each end of the timber T is a lever B (made of iron or wood) say about 8 feet long, and about 6 inches square, which is secured to the timber T by a $1\frac{1}{2}$ inch steel pin which passes through a corresponding hole in the lever B within 6 inches of its lower end; at about 2 feet from the lower end of the lever B is another $1\frac{1}{2}$ inch hole, to receive a steel pin of the same size for the purpose hereinafter mentioned.

The upper end of each of the plates P P and the lower part (say within 2 feet of the lower end of each of the levers B B) are connected by $1\frac{1}{2}$ inch steel pins which pass through corresponding holes near the ends of each of 2 iron straps, $w$ $w$ (each about $2\frac{1}{2}$ feet long, 5 inches wide, and $\frac{3}{4}$ inch thick). One end of each of the straps $w$ is outside of the plate P, and the other end may be either outside of, or pass through a mortise in the lever B; the plate P, and the lever B thus connected forming a compound lever.

At about 6 feet from each end of the timber T, and on its side, an iron bar $c$, about 5 feet long, 4 inches wide, and 1 inch thick, with the lower end the shape of a hook is secured by a bolt which passes through a hole in the bar $c$, at about 2 feet from the hook end, and through the timber T; these iron bars are to be used to nip on the inside, and under the vessel's rail as hereafter described.

The mode of using the marine grapple is as follows: The length of the timber T is graduated so as to be some 2 or 3 feet longer between the pins of the plates in the timber T than the breadth of beam of the vessel to be raised; the compound levers are placed, or lowered, nearly parallel with the timber T; and the iron bars $c$ $c$ are placed in such a position that their lower ends are inclined toward the center of the timber T, with their hooks pointing toward the outer ends of the timber T. The grapple is then lowered down athwartships, and over the deck of the sunken vessel in such a manner that its ends shall rest on the top of the rail on either side, each of the top ends of the iron bars $c$ $c$ are then hauled down by tackles secured to the timber T on its top side and near its center, until the hook points catch under the vessel's rail on the inside, they are then secured in that position which keeps the grapple fast of the vessel; the top ends of the compound levers are then by means of chains hauled up until the hooks of the plates P P are forced into the outsides of the vessel just below the deck sufficiently far to enable the vessel to be raised to the surface, by any known lifting power made fast of the grapple attached as above described; be it here observed that the greater the power applied to the grapple the more firmly will the vessel be held between the hooks on the plates P P.

I do not claim the use of hooks, as box-hooks, can-hooks, &c., as ordinarily used; but What, I do claim as my invention, and wish to secure by Letters Patent is—

The combination of the plates, levers, and iron bars with the timber, constructed in the manner above fully described to form a marine grapple to be used in the raising of sunken vessels as above described; as being a more expeditious method of getting fast of sunken vessels, than by the old fashioned way of sweeping by chains, which is not always successful, and in all cases is more expensive than it would be if the marine grapple was used.

JOSEPH T. MARTIN.

Witnesses:
CHARLES M. MARTIN,
ABIGAIL A. MARTIN.